(12) United States Patent
Karafotis et al.

(10) Patent No.: US 9,672,461 B2
(45) Date of Patent: Jun. 6, 2017

(54) SMART CARD WITH DISPLAY AND PRODUCTION METHOD THEREOF

(71) Applicant: GEMALTO SA, Meudon (FR)

(72) Inventors: Stephane Karafotis, Gemenos (FR); Gilles Kodjagueuzian, Gemenos (FR); Francois Dauphin, Gemenos (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 15/025,063

(22) PCT Filed: Sep. 19, 2014

(86) PCT No.: PCT/EP2014/069964
§ 371 (c)(1),
(2) Date: Mar. 25, 2016

(87) PCT Pub. No.: WO2015/044041
PCT Pub. Date: Apr. 2, 2015

(65) Prior Publication Data
US 2016/0260005 A1 Sep. 8, 2016

(30) Foreign Application Priority Data
Sep. 27, 2013 (EP) .................................... 13306339

(51) Int. Cl.
*G06K 19/06* (2006.01)
*G06K 19/077* (2006.01)

(52) U.S. Cl.
CPC ... *G06K 19/0776* (2013.01); *G06K 19/07703* (2013.01); *G06K 19/07707* (2013.01)

(58) Field of Classification Search
CPC ........... G06K 19/077; G06K 19/07703; G06K 19/07749
(Continued)

(56) References Cited

U.S. PATENT DOCUMENTS 7,286,257 B1 10/2007 Morgavi
8,448,872 B2 5/2013 Droz
(Continued)

FOREIGN PATENT DOCUMENTS

DE 10 2009 009 263 A1 8/2010
DE 10 2011 050 794 A1 12/2012

OTHER PUBLICATIONS

International Search Report (PCT/ISA/210) issued on Dec. 8, 2014, by the European Patent Office as the International Searching Authority for International Application No. PCT/EP2014/069964.
(Continued)

*Primary Examiner* — Seung Lee
(74) *Attorney, Agent, or Firm* — Buchanan Ingersoll & Rooney PC

(57) ABSTRACT

The invention relates to the technical field of smart cards with displays. Such a card comprises, embedded in a transparent core, a multi-component module supporting the display. The card comprises: at least one layer of ink printed on the surface of the transparent core, except in a zone facing the display, said at least one layer being opaque in at least one region; and a transparent film covering the at least one ink layer. The card is characterized in that the at least one layer is formed by a first opaque ink layer printed on the surface of the transparent core, except in a zone facing the display and a second ink layer forming a graphic design allowing customization printed on the first ink layer.

16 Claims, 2 Drawing Sheets

(58) Field of Classification Search
USPC .......................................................... 235/492
See application file for complete search history.

(56) References Cited

U.S. PATENT DOCUMENTS

| | | | |
|---|---|---|---|
| 2005/0025943 A1* | 2/2005 | Krappe | ............. B29C 45/14647 |
| | | | 428/209 |
| 2008/0136887 A1* | 6/2008 | Schmitt | .................. B42D 25/00 |
| | | | 347/106 |
| 2011/0297750 A1 | 12/2011 | Huber et al. | |

OTHER PUBLICATIONS

Written Opinion (PCT/ISA/237) issued on Dec. 8, 2014, by the European Patent Office as the International Searching Authority for International Application No. PCT/EP2014/069964.

* cited by examiner

SMART CARD WITH DISPLAY AND PRODUCTION METHOD THEREOF

The invention relates to the technical field of smart cards with display.

Cards with display are used in particular in the banking sector. They make it possible, not only to display the past transactions, but also to generate and display a single-use password for transactions by computer, for example. These cards have a flexible substrate carrying a printed circuit whereon electronic components are electrically connected and more particularly a microcontroller, a screen, a battery and one or more pushbutton(s) for communicating with the card holder. Specifically, the microcontroller of the printed circuit makes it possible to read information contained in the smart card, specifically the most recent transactions performed, and to display it on the screen.

Figure 1:
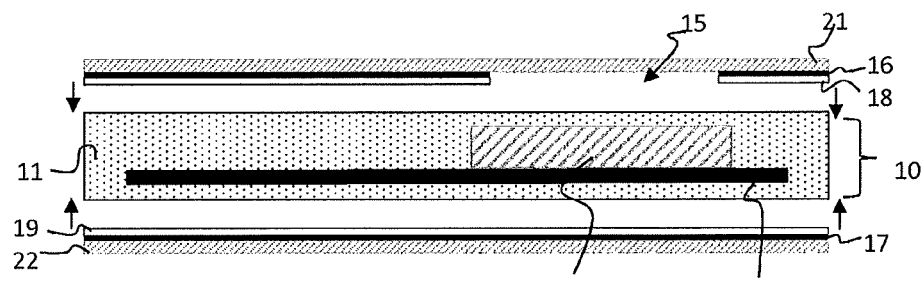

A known method for manufacturing such cards, as shown in FIG. 1, consists in embedding the flexible substrate 12 supporting the printed circuit and the electronic components, in a transparent resin 11, solidified at room temperature, to form a transparent core 10, and then in laminating a transparent protective film 21, 22 onto each side of this transparent core 10. Prior to this lamination, the surface of the transparent film 21, 22 intended to cover a face of the transparent core 10, except for a zone 15 facing the screen 14, is printed with a first ink layer 16, 17 forming a graphic design allowing customization of the card and then with a second opaque ink layer 18, 19. Providing an opaque layer between the transparent core and the graphic customization design avoids on the one hand, obtaining a translucent effect of the graphic customization because of the presence of the transparent core and on the other hand, the appearance of darker zones in the graphic customization, due to variations in the light reflected by the transparent core due to the presence of the electronic components. Printing is obtained using offset or screen printing technologies. Now, to obtain sufficient opacity of the opaque ink layer, several layers must be successively laid which implies extended drying time and generates storage problems during drying periods. Besides, extended drying may damage the transparent protective film 21, 22 supporting the printing. Such a method is therefore long and costly. On the other hand, as the ink used to make the graphic customization poorly adheres to the transparent film, an adhesive film is generally applied onto the ink because such adhesive penetrates through the ink during the lamination and thus enables good adhesion of the transparent film onto the core. However, the successive opaque layers 18, 19, required to obtain sufficient opacity, add thickness which prevents the adhesive from properly penetrating the various ink layers so that problems of film 21, 22 adherence on the core 10 also arise.

As the graphic printing of an opaque layer does not make it possible to obtain, on the one hand, a card with a good visual quality, because of the appearance of defects on the transparent protective film, and on the other hand, sufficient security against external attacks and fraud, because of the delamination of the transparent film and the possibility of re-laminating another printed film onto the transparent core, other alternatives were sought.

Figure 2:
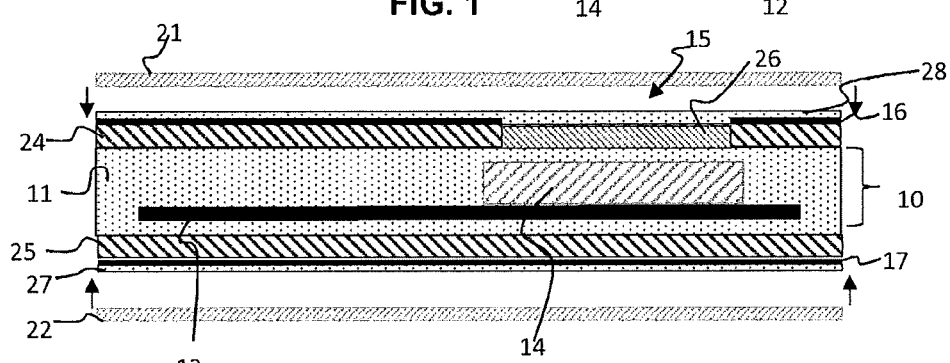

Thus, to avoid such problems of opacity and adhesion, the document U.S. Pat. No. 8,448,872 describes a card with display, as shown in FIG. 2. This card is produced by embedding the flexible substrate 12 supporting the printed circuit and the electronic components including the display 14, in a transparent resin 11, solidified at a low temperature to form the transparent core 10. Then a layer of opaque plastic material 24, 25 is laminated onto each face of this transparent core 10. More particularly, the opaque layer 24 intended to cover the surface of the core facing the display 34 includes a zone 15, located above the display 14, provided with a window 26 made of transparent plastic material. The graphic customization of the card is then achieved by printing an ink layer 16, 17 directly onto the opaque layer 24, 25, except for the transparent window 26. The graphic customization layer is covered with an adhesive film 27, 28 which penetrates through the ink of the graphic customization during the lamination of a transparent external film 21, 22, so as to enable a correct attachment of the film 21, 22 on the opaque layer 24, 26.

However, such an opaque plastic layer 24, 25, 26 adds thickness to the card which already has voluminous and electronic components, especially since such a layer is positioned on both sides of the transparent core 10, to obtain a satisfactory visual quality of the graphic customization on both sides of the card.

The patent application DE 10 2009 009263 A1 describes a method for manufacturing a card with display comprising the steps of providing a plastic core containing a window and of printing an opaque ink layer 30 on the core except for the window, for applying a transparent layer 28 onto the opaque layer, and applying a layer of graphic customization onto the transparent layer.

The invention therefore aims at remedying at least one of the disadvantages of the prior art. In particular, the invention aims at providing a card with a display in accordance with the thickness constraints, having a satisfactory visual appearance and having no delamination problem. The invention also aims at providing an alternative solution for manufacturing such a card with a display that is fast, simple and inexpensive.

For this purpose, the object of the invention is to provide a smart card with display comprising, embedded in a transparent core, a multi-component module supporting said display, with said card being characterized in that it comprises:

at least one ink layer printed on the surface of the transparent core, except in a zone facing said display, with said at least one layer being opaque in at least one region a transparent film covering said at least one ink layer.

The ink layer is thus printed directly on the transparent core so that the transparent protective film is not damaged upon printing and drying of ink in particular. The cohesion between the various layers of the card provides very good support of the assembly, the transparent film adheres to the ink used which itself adheres to the transparent core. Such a card has a visual appearance of good quality without defect in the transparent protective film and without delamination problem.

According to other optional characteristics of the card:

said at least one layer is formed by a first opaque ink layer printed on the surface of the transparent core, except in a zone facing said display, and a second ink layer forming a graphic design allowing customization printed on said first ink layer, the card further comprises a layer of transparent varnish printed on said zone of said transparent core facing said display, the thickness of the varnish layer is equal to the thickness of said at least one ink layer, it further comprises, between the transparent core and said at least one printed layer and/or the layer of transparent varnish, a layer of a heat-activatable transparent adhesive, the heat-activatable transparent adhesive layer is a thermoplastic polyurethane the material composing the transparent core is a thermally re-activatable solidified resin, the thermally re-activatable resin is a resin of the epoxy type or of the polyurethane copolymer type, the inks and/or varnishes composing the printed layer(s) are UV-curable, under UV radiation diodes, the ink composing the opaque regions and/or the first opaque layer comprises a titanium dioxide-based hiding pigment.

The invention further relates to a method for manufacturing a smart card with display having a multi-component module supporting said display, with said method firstly consisting in embedding the multi-component module in a transparent core and further comprising the following steps:

printing on the surface of the transparent core except in a zone facing said display, at least one ink layer at least one region of which is opaque, laminating a transparent film onto said at least one ink layer.

According to other optional characteristics of the method:

the step of printing said at least one layer is executed by printing two distinct layers, with a first layer, printed on the surface of the transparent core except in a zone facing said display, forming an opaque ink layer, and a second ink layer, printed on said first opaque ink layer, forming a graphic design allowing customization, the method further comprises the step of printing a layer of transparent varnish on said zone of the transparent core facing said display, ink jet is used for the steps of printing, the steps of printing the various layers of ink and/or transparent varnish can be carried out independently, or simultaneously with the same ink jet printing equipment, the steps of printing the first and second ink layers are carried out with the same ink jet printing equipment, the steps of printing the first ink layer and the layer of transparent varnish are carried out simultaneously with the same ink jet printing equipment, the steps of printing the second ink layer and the layer of transparent varnish are carried out simultaneously with the same ink jet printing equipment, the steps of printing the first and second ink layers and the layer of transparent varnish are carried out simultaneously with the same ink jet printing equipment, a layer of a heat-activatable adhesive is deposited prior to the first step of printing, the step of laminating the transparent film is carried out at a temperature of less than 100° C., preferably less than 95° C., for less than 10 minutes, preferably less than 5 minutes.

Printing the ink layer(s) using ink jet makes it possible not to damage the resin composing the transparent core and to print a sufficient amount of ink for obtaining a satisfactory opacity. During the step of laminating, the heat-activatable adhesive film or heat-activatable resin composing the core, makes it possible to obtain a good adhesion of the ink layer(s) on the transparent core as well as on the transparent protective film.

Figure 3:
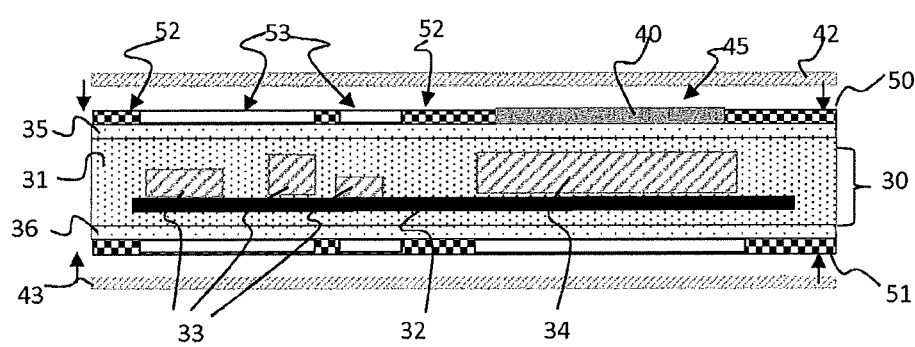
Figure 4:
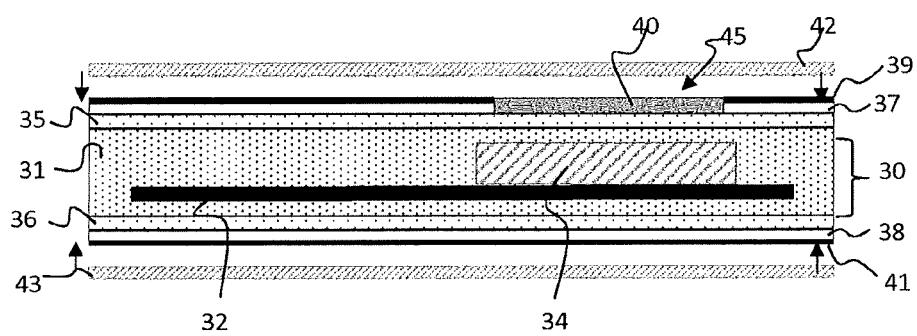
Figure 5:
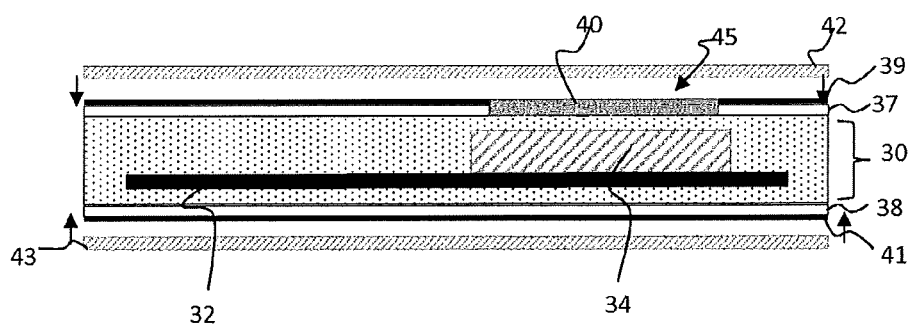

Other characteristics and advantages of the invention will become apparent from the following description given by way of illustrative and non-limiting example, with reference to the appended figures which show:

FIG. 1, already described, is a sectional diagram of a card with display according to a first embodiment of the prior art, FIG. 2, already described, is a sectional diagram of a card with display according to a second embodiment of the prior art, FIG. 3 is a sectional diagram of a card with display according to a first embodiment of the invention, FIG. 4 is a sectional diagram of a card with display according to another embodiment of the invention, FIG. 5 is a sectional diagram of a card with display according to still another embodiment.

In the following description, "ink layer" means a homogeneous layer of superimposed and/or juxtaposed ink drops.

Electronic module means a module provided with an integrated circuit chip electrically connected to a communication interface with and/or without contact.

Multi-component module means a module consisting of a flexible substrate supporting a printed circuit whereon an electronic module and other electronic components, among which a display, are electrically connected.

The invention applies to any type of smart card with display operating with and/or without contact. The communication interface of the card electronic module comprises external contact pads in the ISO7816 format, i.e. intended to be flush with the surface of the card, and/or an antenna embedded in the card body adapted to communicate without contact according to the ISO 14443 standard. The electronic module is a part of a multi-component module. The multi-component module particularly comprises a flexible substrate supporting a printed circuit, the display and other components such as a battery, a microcontroller able to access information contained in the chip and to display it on the display and optionally one or more pushbutton(s) for communicating with the card holder.

The same references are used in FIGS. 3 to 5 to refer to the same elements.

FIG. 3 shows a diagram of such a smart card with display in sectional view. The card consists of several layers stacked on a central core 30. The core, with reference 30 in FIG. 3, comprises the multi-component module formed by a flexible substrate with reference 32, supporting a printed circuit (not shown) and various electronic components 33, among which the display, with reference 34. This multi-component module 32, 33, 34 is embedded in a transparent core formed by a transparent resin 31 solidified at room temperature. The multi-component module is therefore embedded in resin 31.

The material composing the resin 31 may for example be a transparent resin, of the PU polyurethane type, curing at room temperature.

Optionally, the multi-component module may for example be placed in a layer of plastic material, such as PVC (polyvinyl chloride) acting as a spacer and making it possible to hold the multi-component module and to set the position thereof in the core of resin 31 during embedding.

In a subsequent step, a heat-activatable transparent adhesive layer is deposited onto each of the external surfaces of the transparent core. This adhesive is specifically selected from thermoplastic polyurethanes, also known as TPU (the acronym for "Thermoplastic Polyurethane"). This adhesive adheres well to the resin composing the transparent core. The temperature for implementing such adhesive is preferably about 90° C. to enable a good adhesion with the printed ink layer(s) on its surface, upon the subsequent lamination of a transparent protective film. Each of the heat-activatable transparent adhesive layers is referenced 35 and 36 in FIGS. 3 and 4.

Each adhesive layer 35, 36 is then coated with at least one ink layer 50, 51. This layer 50, 51 advantageously has at least one opaque region 53 facing the electronic component(s) 33 of the multi-component module 32, except in a zone 45 facing the display 34. The layer 50, 51 also forms an additional customization design, which may be opaque or not depending on the desired visual effect in at least one further region 52 having no facing electronic component. More particularly, the zone 45 of the surface of the core 30, facing the display 34 is not coated with such ink layer, but shows an opening above the display 34.

In a preferred embodiment, as illustrated in FIG. 4, the ink layer is formed of a first opaque ink layer 37, 38, except in a zone 45 facing said display 34, and a second ink layer 39, 41 forming a graphic customization design printed on said first ink layer 37, 38. The second ink layer forming the graphic customization design may be mono- or polychromic.

In this case, the opaque ink layer 37, 38 is preferably, but not exclusively, white. This white color can advantageously be obtained by means of a $TiO_2$ (Titanium dioxide)-based hiding pigment.

The ink used for forming the printed ink layer(s), is preferably a UV-curable ink. Advantageously, the ink used can be cured under UV radiation diodes, also referred to as Led-UV. These diodes have the advantage of consuming very little energy and not overheating the support whereon the ink is applied. Thus, the heat-activatable transparent TPU adhesive 35, 36 is not activated by any heat input so that it is possible to print directly onto this adhesive. After UV drying, the ink layer(s) has/have a minimum thickness of 10 μm.

A transparent varnish 40 is further applied by printing into the opening above the zone 45 facing the display 34. Preferably, the varnish is also a cold UV-curable varnish, i. e. curable under Led-UV.

Using UV-curable, i.e. curable under Led-UV inks and varnishes makes it possible to obtain a quick cool drying. Moreover, the opacity of the ink used to form the opaque regions 53 or the opaque layer 37, 38 is much better than conventional inks containing solvents since, in the case of UV inks, the solvents do not evaporate when drying. There is no loss of material and the thickness of the layer after drying is equal to the thickness of ink applied, i.e. at least 10 μm.

Advantageously, the inks and varnishes are applied by ink-jet. This technique is particularly advantageous because it makes it possible to print in a single layer, a sufficient amount of UV ink to obtain opacity of the opaque regions 53 or of the first layer 37, 38 which is satisfactory. In addition, the inkjet printing technique requires only little heat so it does not deteriorate the resin 31 composing the transparent core 30 nor the adhesive layer 35, 36.

Advantageously, when the ink layer printed on the surface of the transparent core 30 consists of several layers, the steps of printing the various layers may be carried out independently or simultaneously, with the same ink jet printing equipment. Thus, the first ink layer 37, 38 and the second ink layer 39, 41, or the first ink layer 37 and the transparent varnish layer 40, or the second ink layer 39 and the transparent varnish layer 40, or eventually all the ink 37, 39; 38, 41 and transparent varnish 40 layers may be simultaneously or almost simultaneously produced with the same ink jet printing equipment.

A device such as the one described in U.S. Pat. No. 7,286,257 makes it possible to print various layers above in one or more pass(es) by managing multiple printing heads dedicated to a different printing material. For example, an opaque 24 and transparent layer 40 in a window of the opaque layer and having the same thicknesses may be produced simultaneously during a pass or multiple passes of the plastic core in front of material or ink jet printing heads.

The various layers may be selectively deposited onto at least a portion of the plastic core or of the complementary parts. The opaque layer may be deposited only opposite electronic components or any component (or portion) intended to be hidden.

A final step then consists in laminating a transparent protective film 42, 43 on the surface of the layer 50, 51, or of the second layer 39, 41, and of the transparent varnish 40. Such a transparent film generally has a thickness of about 150 μm. It is preferably coated with an adhesive of the polyurethane PU or TPU thermoplastic polyurethane types. It makes it possible to protect the surface of the card and the design for customization against external attacks and fraud.

Advantageously, the heat-activatable adhesive layer 35, 36 in thermoplastic TPU polyurethane and the coating adhesive of the transparent protective film, in PU or TPU polyurethane, enable a lamination of the transparent protective film at a lower temperature than the temperature conventionally used, generally between 130 and 150° C., to laminate films onto smart cards.

Thus, laminating is performed at a temperature of less than 100° C., preferably less than 95° C., and even more preferably less than 92° C., for a period of less than 10 min and preferably less than 5 min. Such laminating at a low temperature makes it possible not to damage the materials composing the transparent film and the core, not to deform the display 34, and to let the adhesive materials of the TPU adhesive layer 35, 36 and the transparent protective film 42, 43 trap the ink layers 50, 51 or 37, 38, 39, 41 and the varnish layer 40 to enable a good adhesion of all the layers with each other.

The thickness of the transparent varnish layer 40, which is applied to the zone 45 facing the display 34, is advantageously equal to the thickness of the ink layer 50 printed on the surface of the transparent core, or to the sum of the thicknesses of the first and second ink layers 37 and 39 when the printed layer consists of two separate layers, in order to keep flatness over the entire surface of the card by closing the opening left by the two ink layers. Another advantage of this transparent varnish layer 40 is that it also makes it possible to protect the display 34 during the step of laminating.

In an alternative embodiment, water-containing UV-inks can be used. In this case, during the Led-UV drying, the water contained in the ink evaporates, so that the thickness of the ink layer remaining after drying is less than the thickness of the applied ink layer, but greater than the thickness obtained after heat-drying of a conventional solvent ink layer. In this case, the thickness of the layer 50 or the sum of the thicknesses of the opaque layers 37, 39 with graphic customization is sufficiently thin, for example less than 8 μm, so that it is no longer necessary to compensate the thickness in the zone 45 facing the display, with a layer of transparent varnish. In this case indeed, the transparent protective film 42 and its coating PU or TPU adhesive are sufficient to compensate for this difference in thickness.

FIG. 5 shows a diagram of another card with display in sectional view, according to another embodiment. The same references as in FIG. 4 are used to refer to the same elements. The essential difference between this embodiment and that of FIG. 4 is that it does not comprise TPU adhesive layer between the core 30 and the first ink layer 37, 38 and between the core 30 and the varnish layer 40. In this case, the resin material 31 selected to embed the multi-component module is thermally re-activatable. Such a resin may for example be a resin of the epoxy or polyurethane copolymer types which can also be reactivated at a relatively low temperature and enables laminating at a temperature of less than 95° C. Thus, during the step of laminating the transparent protective film 42, 43 onto the core 30 supporting the ink layers 37, 38, 39, 41 and the varnish layer 40, the surface of the resin 31 composing the core liquefies so that it adheres to the ink and varnish layers like the TPU adhesive layer of the first two embodiments. The ink and varnish layers thus very well adhere, on the one hand, to the transparent core and on the other hand, on the transparent film coating adhesive protection, thus ensuring a very good cohesion of the assembly.

The various embodiments thus make it possible to obtain a card complying with the thickness constraints set by the ISO 7816 standard, with a good visual appearance, without defects in the transparent protective film, and without delamination problems.

The invention claimed is:

1. A smart card with display comprising:
    embedded in a transparent core, a multi-component module supporting said display;
    at least one layer of ink printed on the surface of the transparent core, except in a zone facing said display, with said at least one layer being opaque in at least one region, and
    a transparent film covering said at least one ink layer, wherein said at least one layer is formed by a first opaque ink layer printed on the surface of the transparent core, except in a zone facing said display, and a second ink layer forming a graphic design allowing customization printed on said first opaque ink layer, said second ink layer being at least partially non-opaque or polychromic.

2. The smart card according to claim 1, further comprising a layer of transparent varnish printed on said zone of said transparent core facing said display.

3. The smart card according to claim 2, further comprising, between the transparent core and said at least one printed layer and/or the layer of transparent varnish, a layer of a heat-activatable transparent adhesive.

4. The smart card according to claim 3, wherein the heat-activatable transparent adhesive layer is a thermoplastic polyurethane.

5. The smart card according to claim 1, wherein a material composing the transparent core is a thermally re-activatable solidified resin.

6. The smart card according to claim 5, wherein the thermally re-activatable resin is a resin of the epoxy type or of the polyurethane copolymer type.

7. The smart card according to claim 1, wherein the inks and/or varnishes composing the printed layer are UV-curable, under UV radiation diodes.

8. A method for manufacturing a smart card with display having a multi-component module supporting said display, said method comprising:
    embedding the multi-component module in a transparent core:
    printing on the surface of the transparent core, except in a zone facing said display, at least one ink layer, at least one region of which is opaque, and at least one other region of which is at least partially non-opaque or polychromic, and
    laminating a transparent film onto said at least one ink layer.

9. The method according to claim 8, wherein the step of printing said at least one layer is executed by printing two distinct layers, with a first layer, printed on the surface of the transparent core except in a zone facing said display, forming a first opaque ink layer, and a second ink layer, printed on said first opaque ink layer, forming a graphic design allowing customization.

10. The method according to claim 9, wherein the steps of printing the various layers of ink and/or transparent varnish can be carried out independently, or simultaneously with the same ink jet printing equipment.

11. The method according to claim 8, further comprising the step of printing a layer of transparent varnish on said zone of the transparent core facing said display.

12. The method according to claim 8, wherein ink jet is used for the steps of printing.

13. The method according to claim 8, wherein a layer of a heat-activatable adhesive is deposited prior to the first step of printing.

14. The method according to claim 8, wherein the step of laminating the transparent film is carried out at a temperature of less than 100° C., for less than 10 minutes.

15. The method according to claim 14, wherein the step of laminating the transparent film is carried out at a temperature of less than 95° C.

16. The method according to claim 14, wherein the step of laminating the transparent film is carried out for less than 5 minutes.

* * * * *